United States Patent
Wagner

(10) Patent No.: US 10,495,538 B2
(45) Date of Patent: Dec. 3, 2019

(54) MODULAR SENSOR PACKAGE HAVING ADHESIVE-FREE SEAL TO HOUSING

(71) Applicant: Measurement Specialties, Inc., Hampton, VA (US)

(72) Inventor: David E. Wagner, Los Gatos, CA (US)

(73) Assignee: Measurement Specialties, Inc, Hampton, VA (US)

( * ) Notice: Subject to any disclaimer, the term of this patent is extended or adjusted under 35 U.S.C. 154(b) by 138 days.

(21) Appl. No.: 15/707,170

(22) Filed: Sep. 18, 2017

(65) Prior Publication Data

US 2019/0086283 A1 Mar. 21, 2019

(51) Int. Cl.
*G01L 19/14* (2006.01)
*G01L 7/08* (2006.01)
*G01L 9/00* (2006.01)

(52) U.S. Cl.
CPC .............. *G01L 19/14* (2013.01); *G01L 7/084* (2013.01); *G01L 9/0055* (2013.01); *G01L 19/143* (2013.01)

(58) Field of Classification Search
None
See application file for complete search history.

(56) References Cited

U.S. PATENT DOCUMENTS

| | | | |
|---|---|---|---|
| 6,127,713 A * | 10/2000 | Takeuchi | G01L 19/147 257/419 |
| 7,900,520 B2 * | 3/2011 | Colombo | G01L 19/147 257/419 |
| 9,506,830 B2 * | 11/2016 | Aoyama | G01L 19/0046 |
| 9,593,995 B2 * | 3/2017 | Wagner | G01L 13/025 |
| 10,144,636 B2 * | 12/2018 | le Neal | B81C 1/00301 |

* cited by examiner

*Primary Examiner* — Peter J Macchiarolo
*Assistant Examiner* — Jermaine L Jenkins
(74) *Attorney, Agent, or Firm* — Howard IP Law Group

(57) ABSTRACT

A sensor assembly comprising a housing defining a cavity, and a pressure sensor package arranged within the cavity. The pressure sensor package includes a substrate having an aperture defined therethrough, a semiconductor die including a sensing diaphragm attached to the substrate such that the diaphragm is exposed via the aperture, and at least one electrically conductive element in electrical communication with the semiconductor die arranged on the substrate. A sealing element, such as an elastomeric o-ring, provides a seal between the housing and the substrate. A connector is secured to the housing via a crimped connection for establishing electrical connections between the pressure sensor package and an external system.

19 Claims, 9 Drawing Sheets

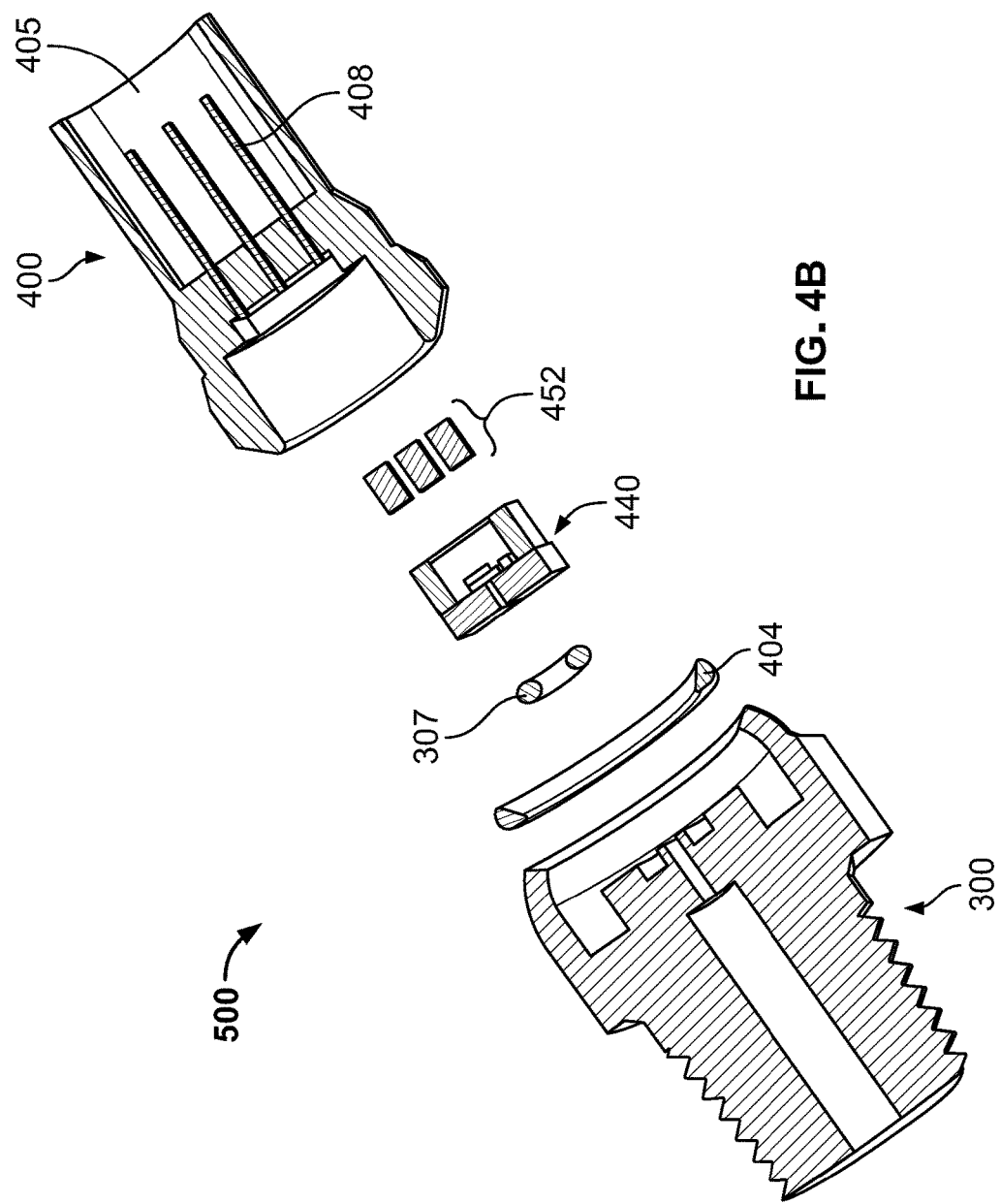

MODULAR SENSOR PACKAGE HAVING ADHESIVE-FREE SEAL TO HOUSING

FIELD OF THE INVENTION

The application relates to sensors. More particularly, the application relates to sensors for detecting, for example, pressures of gases and other fluids.

BACKGROUND OF THE INVENTION

A pressure sensor (or transducer) converts a fluid or gas pressure to an electrical signal as a function of the pressure imposed. These sensors are generally embodied in pressure sensor packages, and include a pressure-sensing device such as a silicon die. Such devices are typically manufactured using micro-machined or Micro-Electro-Mechanical System (MEMS) based techniques. One common technique for manufacturing a pressure sensor package is to attach a MEMS device onto a substrate, such as a ceramic or printed circuit board (PCB) substrate, via an adhesive. Enabling circuit components such as application-specific integrated circuits (ASICs), as well as conductive bonding pads and/or electrical traces, may be mounted to or formed on the substrate for electrically connecting to the MEMS device to perform desired functions (e.g. analog to digital conversion and/or amplification).

Silicon and/or other semiconductor materials used to form the pressure sensing device, however, have coefficients of thermal expansions (CTEs) that are significantly different than those of the ceramic or PCB materials used to form the substrates. This CTE mismatch can lead to inaccurate pressure measurements due to strain placed on the sensing device resulting from environmental temperature changes. Moreover, the adhesives used to attach the MEMS device to the substrate are subject to failure, particularly when exposed to harsh or corrosive media. For example, in applications which expose the sensor to harsh or corrosive media (e.g., in a fuel pressure sensing application), the adhesive can break down and ultimately fail. Likewise, as the substrate is typically adhered to a housing of a pressure sensor package, this junction is also subject to the same risk of failure when used in harsh or corrosive environments.

Alternative sensor systems and methods of manufacture thereof are desired.

SUMMARY

In one embodiment of the present disclosure, a sensor assembly for measuring a force is provided. The sensor assembly comprises a housing defining a cavity, and a pressure sensor package arranged within the cavity. The pressure sensor package includes a substrate having an aperture defined therethrough and a semiconductor die including a sensing diaphragm attached to the substrate such that the diaphragm is exposed via the aperture. The package further includes a die housing arranged on the substrate and surrounding the semiconductor die. The die housing defines at least one aperture formed therethrough for receiving at least one electrically conductive element in communication with the semiconductor die. The assembly also includes a sealing element, such as an elastomeric o-ring, providing an adhesive-free seal between the housing and the substrate.

In another embodiment of the present disclosure, a method of manufacturing a sensor is provided. The method includes the steps of attaching a silicon sensing device to a substrate to form a pressure sensor package. The package is inserted into and arranged on a surface of a cavity formed within a pressure sensor housing. The pressure sensor housing is then plastically deformed in order to secure the connector at least partially within the cavity, as well as to generate and apply a force on the pressure sensor package to create an adhesive-free seal between the pressure sensor package and the pressure sensor housing.

In another embodiment, a sensor assembly comprises a housing defining a cavity, and a pressure sensor package arranged within the cavity. The package includes a substrate having an aperture defined therethrough and a semiconductor die including a sensing diaphragm attached to the substrate such that the diaphragm is exposed via the aperture. The assembly further comprises a sealing element for providing a seal between the housing and the substrate, and a connector arranged at least partially within the cavity and secured therewith via a crimped connection. The connector houses a plurality of electrical conductors for establishing an electrical connection with the pressure sensor package.

BRIEF DESCRIPTION OF THE DRAWINGS

FIG. 4B is an exploded view of the pressure sensor assembly and electrical connector of FIG. 4A.

DETAILED DESCRIPTION

Figure 1:
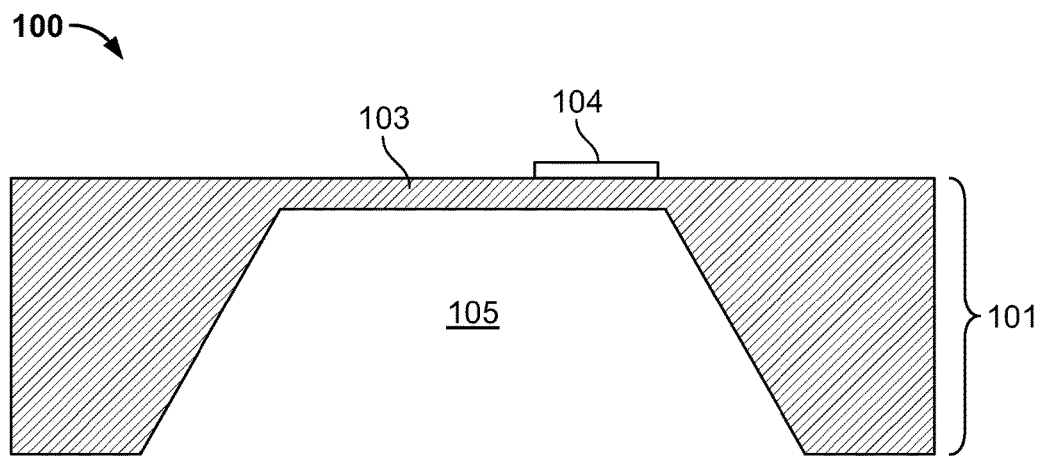
FIG. 1 is a cross-sectional view of a pressure sensor die useful for describing embodiments of the present disclosure.

It is to be understood that the figures and descriptions of the present invention have been simplified to illustrate elements that are relevant for a clear understanding of the present invention, while eliminating, for purposes of clarity, many other elements found in typical sensing systems, such as MEMS-based sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

FIG. 1 is a cross-sectional view of a MEMS-type pressure sensing die or device 100 useful for describing embodiments of the present disclosure. Die 100 is formed from, for example, a semiconductor material such as a silicon wafer to produce a structure 101. Semiconductor structure 101 is then selectively thinned to define a cavity 105 and a corresponding pressure-sensitive diaphragm 103. Semiconductor structure 101 may be thinned by any suitable means (e.g., using anisotropic etching or dry etching) as is known in the art. One or more piezo-resistive elements 104, by way of example only, are placed or formed on a surface of diaphragm 103. Each piezo-resistive element 104 is configured to exhibit a resistance that is proportional to the strain placed on the thinned semiconductor material defining diaphragm 103. Deflection of diaphragm 103 in response to a pressure within cavity 105 applies strain on piezo-resistive elements 104.

Figure 2:
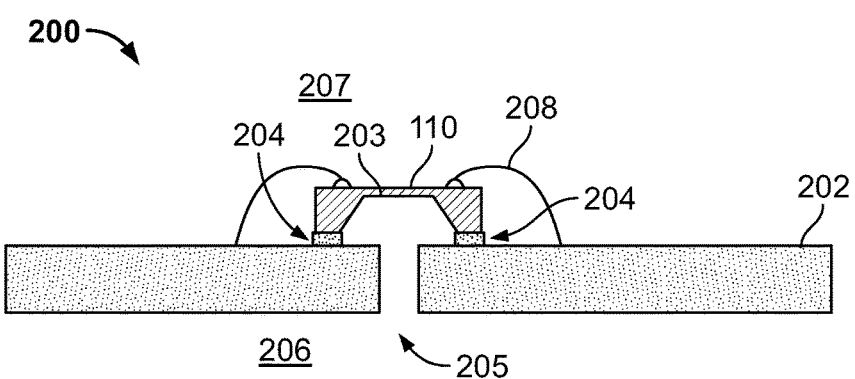
FIG. 2 is a cross-sectional view of a pressure sensor package according to the prior art.

FIG. 2 is a simplified cross-sectional view of a MEMS pressure sensor package 200 of the prior art utilizing a pressure sensing die similar to that set forth above with respect to FIG. 1. As illustrated, pressure sensing die 110 is mounted to a ceramic or PCB substrate 202 via an adhesive material 204. An opening or aperture 205 is defined through substrate 202 for providing communication between a fluid or gas medium to be measured 206 and an underside of a pressure-sensitive diaphragm 203 of pressure sensing die 110. As shown, in addition to securing pressure sensing die 110 to substrate 202, adhesive material 204 forms a seal for isolating fluid or gas medium 206 from an external environment 207, as well as from electrical components and connections of package 200. In other embodiments, pressure sensing die 110 may be mounted to a support structure or constraint (not shown) which is in turn bonded or otherwise adhered to substrate 202 for isolating die 110 from sources of strain, such as the thermal expansion of substrate 202. Electrical connections between pressure sensing die 110 and electrical features (e.g., bond pads, metalized conductors, or electrical components such as one or more ASICs) may be made via one or more bond wires 208. These features may be mounted to substrate 202, or arranged remotely therefrom.

In operation, when a force or pressure is exerted on pressure sensing die 110, an electrical signal supplied through piezo-resistive elements (e.g., element(s) 104 of FIG. 1), by way of example only, varies in proportion to the amount of deflection of diaphragm 203. Thus, a resulting output electrical signal is representative of the force applied to diaphragm 203 of pressure sensing die 110. An output electrical signal can be provided (e.g., via bond wires 208) to other system circuitry, such as control or calibration circuits for generating data indicative of a sensed force or pressure from the output electrical signal. This data may be stored, by way of non-limiting example, in an electronic memory. Output data may also be provided to other processing components for purposes such as display, control, parameter sensing (e.g., altitude, flow, depth), calibration, diagnostic purposes and/or other applications, by way of example only.

As described above, in certain applications, pressure sensor package 200 may be subject to harsh or corrosive medium, such as fuel or oil. Adhesive material 204 used to secure pressure sensing die 110 to substrate 202 may be exposed to these mediums, and may corrode over time. This corrosion can lead to a partial or complete failure of the joint or seal, resulting in the leakage of fluid 206 into environment 207 which can damage components of the sensor and/or otherwise negatively affect its performance. Likewise, the corrosive environment can have similar detrimental effects on an adhesive joint formed between substrate 202 and, for example, a pressure sensor housing to which it is mounted. Embodiments of the present disclosure remedy these shortcomings by providing a pressure sensor package that eliminates the risk of these types of failures.

Figure 3A:
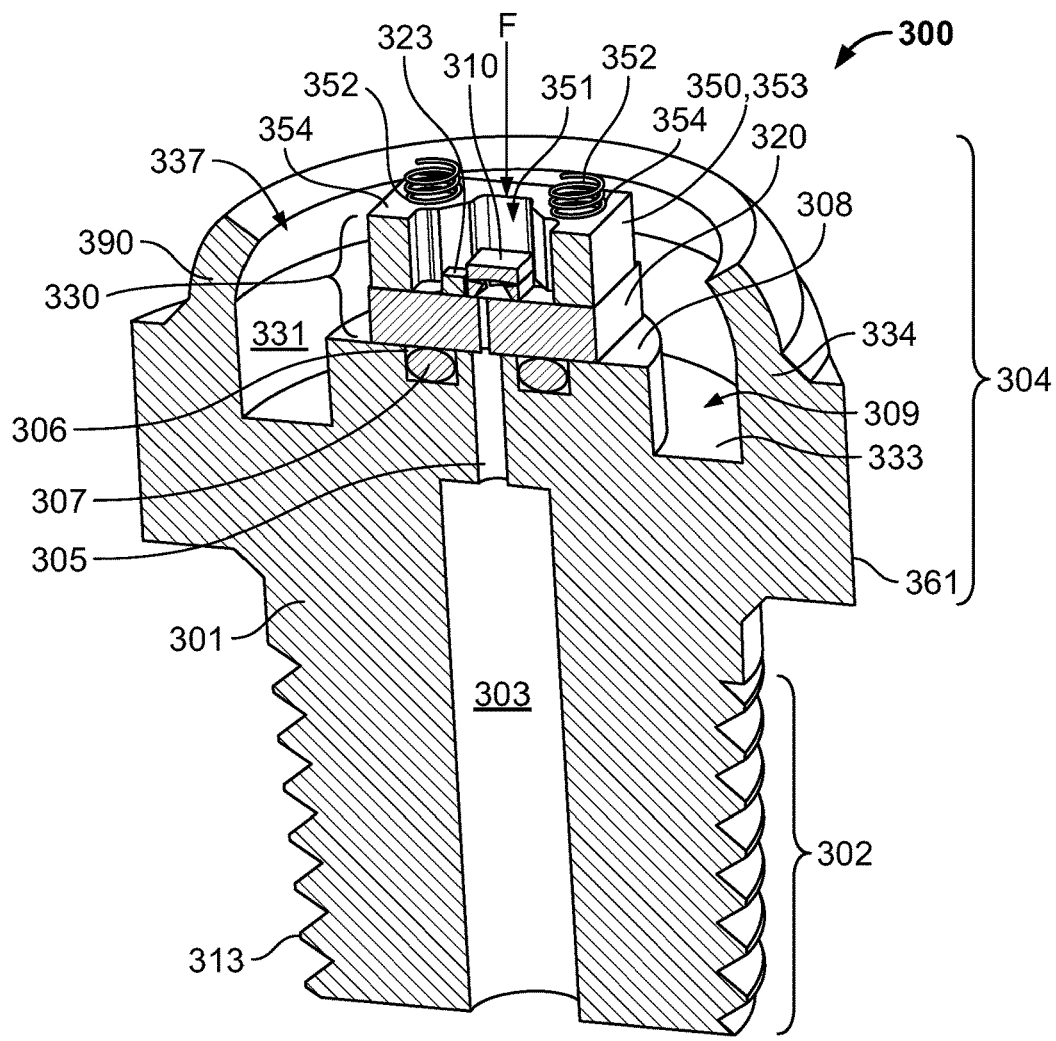
FIG. 3A is a cross-sectional view of a pressure sensor assembly, including a pressure sensor package and pressure sensor housing, according to an embodiment of the present disclosure.

Referring generally to FIG. 3A, a cross-sectional view of simplified pressure sensor assembly 300 according to an embodiment of the present disclosure is provided. Pressure sensor assembly 300 comprises a sensor body or housing 301, which may be constructed of, for example, metals, polymers or other materials suitable for the environment in which the sensor assembly is to be utilized. Housing 301 generally defines a lower housing section 302 and an upper housing section 304. In the illustrated embodiment, lower housing section 302 is embodied as a port and is generally cylindrical in shape and may include a threaded section 313 formed on an outer surface thereof, for example, for securing pressure sensor assembly 300 to a desired external feature (e.g., a corresponding threaded bore formed through a fluid-carrying body such as a pipe). Lower housing section 302 may be threadably inserted into a corresponding opening via a drive surface 361 (e.g. a hexagonal drive surface) defined by body 301.

Upper housing section 304 of housing 301 defines a recess or cavity 331 having an open end 337 exposing cavity 331. More specifically, cavity 331 is defined by a lower surface or cavity floor 333 of housing 301 and an annular or circumferential wall 334 extending therefrom. A portion 390 of wall 334 may extend or arc radially inward creating a crimped profile in an area of open end 337 of cavity 331. Upper housing section 304 further includes a pedestal or protrusion 308 extending generally vertically from cavity floor 333. In the exemplary embodiment, protrusion 308 comprises a generally cylindrical profile. An annular recess 309 is defined between protrusion 308 and circumferential wall 334. Protrusion 308 further defines a channel 306, such as an annular channel, formed therein. Channel 306 is configured (i.e., sized and located) to receive a sealing element 307, such as an elastomeric (e.g., rubber) "o-ring" seal.

Housing 301 further defines a first aperture or opening 303 formed in a bottom thereof and extending generally through lower housing section 302. First opening 303 extends generally along a central axis of housing 301 to a first depth. A second aperture or opening 305 is formed generally through protrusion 308 and may be oriented in axial alignment with first opening 303 such that first and second openings 303, 305 are in fluid communication with one another. In the exemplary embodiment, first opening 303 comprises a diameter that is greater than that of second opening 305. As illustrated, sealing element 307 is arranged circumferentially about second opening 305.

Figure 3B:
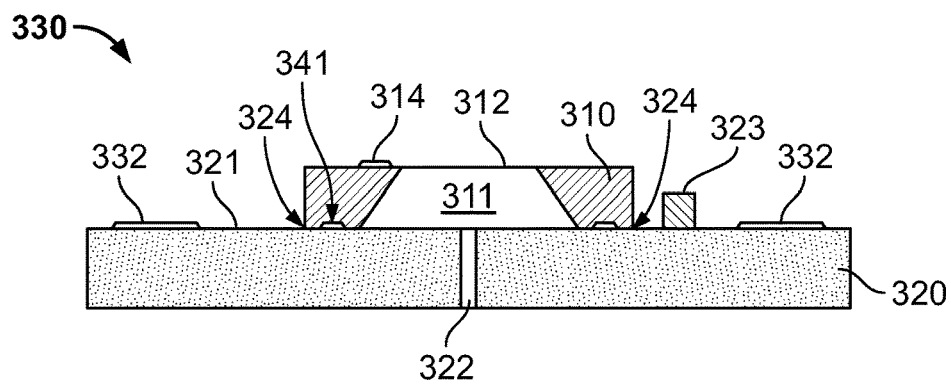
FIG. 3B is a cross-sectional view of the pressure sensor package utilized in the pressure sensor assembly of FIG. 3A.

Referring now to both FIG. 3A and FIG. 3B, pressure sensor assembly 300 further comprises a pressure sensor package 330. Pressure sensor package 330 includes a pressure sensing die 310, such as a semiconductor (e.g. silicon) die. As set forth above, die 310 may be selectively thinned to form a cavity 311 and a corresponding diaphragm 312 having piezo-resistive or piezo-sensitive elements 314, by way of example only, arranged or formed on die 310 for detecting diaphragm strain in response to a force acting thereon. Pressure sensor package 330 further comprises a glass substrate 320 defining an aperture 322 formed therethrough (e.g. by a drilling operation). Glass substrate 320 may comprise borosilicate glass, or other materials bondable (e.g., anodically bondable) to silicon. Die 310 may be arranged directly on glass substrate 320 such that diaphragm 312 and cavity 311 are in communication with aperture 322. In this way, an underside of diaphragm 312 may be exposed to a fluid or medium via aperture 322 (and openings 303,305 of housing 301) for detecting a pressure applied thereto.

Glass substrate 320 may be selectively metalized on a first or top surface 321 thereof for forming electrically conductive features for establishing operational connections with die 310. This metallization can be realized by screen printing, electrodeposition, sputtering or evaporation, by way of non-limiting example only. By way of further example, one or more conductive bond or connection pads 332 may be formed on top surface 321 of glass substrate 320. Bond wires may also be provided for forming electrical connections between die 310 and bond or connection pads 332. In other embodiments, such as those manufactured using "flip chip" techniques, electrical connections between die 310 and conductive features on glass substrate 320 may be achieved via conductive pads and/or solder bumps 341 formed on top surface 321 of glass substrate 320 and/or a bottom-facing side or surface of die 310. Other electrical components (active and/or passive), such as one or more ASICs 323, may also be arranged on glass substrate 320 for providing additional functionality to the package. This signal conditioning circuitry may provide for, for example, amplification, analog-to-digital conversion, offset compensation circuitry, and/or other suitable signal conditioning electronics. Electrical connection to an overall system can be made by surface mounted wires from electrical traces or vias present on the substrate.

According to embodiments of the present disclosure, die 310 may be anodically bonded or electrostatically sealed to glass substrate 320 at a junction 324 extending around a perimeter of die 310. This process results in the formation of a strong, hermetic seal between die 310 and glass substrate 320, isolating a fluid or medium to be measured, including cavity 311 from an external environment. It should be understood that this adhesive-free bond is unaffected by any corrosive properties of a fluid or medium and without the limitations of adhesives. Moreover, as the CTE of the silicon or other semiconductor material used to form die 310 more closely matches the CTE of glass substrate 320, pressure sensor package 330 offers improved performance and reliability compared to prior art sensors having a more significant CTE mismatch between a sensing die and a substrate material thereof. These embodiments may also eliminate the need for further provisions, such as glass constraints, for isolating die 310 from unwanted sources of strain. In other embodiments, die 310 may be secured to a substrate of any suitable material, via other suitable techniques, such as soldering, glass frit and eutectic operations, without departing from the scope of the present disclosure.

Referring again to FIG. 3A, pressure sensor package 330 further comprises a die housing or lid 350. Die housing 350 comprises a circumferential wall 353 defining a cavity space or aperture 351. Die housing 350 may be arranged on and attached to glass substrate 320. Die housing 350 is configured (i.e., sized and located) such that it generally surrounds, or at least partially surrounds, pressure sensing die 310, as well as ASIC 323, for example. Die housing 350 further defines apertures 354 formed therethrough. Electrical conductors, embodied herein as elastic coil spring elements 352, may be arranged within apertures 354. Die housing 350 and apertures 354 are configured (i.e., sized and located), such that the locations of apertures 354 correspond generally to, for example, bond or connection pads 332 formed on top surface 321 of glass substrate 320 (FIG. 3B). In this way, spring elements 352 may be used to enable electrical connections between pressure sensor package 330 and an external portion of the system. For example, a electrical connector or plug assembly (see FIGS. 4A-4C) configured to cover open end 337 of cavity 331 may comprise an integrated plug assembly for connecting to an external electrical system. This plug assembly may comprise conductive elements configured to engage with free ends of spring elements 352, forming an electrical connection therewith. The plug assembly may also be configured to connect to a corresponding plug associated with the external electrical system. In embodiments, pressure sensor package 330 may be coated with, for example, a gel for increasing humidity and water protection prior to being incorporated into pressure sensor assembly 300. It should be understood that pressure sensor package 330 may be manufactured, and thus tested, independently of (and in advance of its incorporation into) pressure sensor assembly 300.

Still referring to FIG. 3A, pressure sensor package 330 is secured to and forms a seal with a top surface of protrusion 308. More specifically, during assembly of pressure sensor assembly 300, pressure sensor package 330 may be inserted into cavity 331 via open end 337 thereof. Pressure sensor package may then be placed onto the exposed top surface of protrusion 308 of housing 301 such that aperture 322 is arranged in communication with second aperture or opening 305 of housing 301, and thus in communication with first aperture or opening 303. In one embodiment, an area corresponding in size and shape to pressure sensor package 330 of the top surface of protrusion 308 may be recessed. In this way, a portion of pressure sensor package 330, such as substrate 320, may be accepted therein, aiding in the accurate placement thereof during manufacturing. Elastomeric sealing element 307 is configured, in response to a downward force or pressure F placed on, for example, die housing 350 or glass substrate 320, form a seal between glass substrate 320 of pressure sensor package 330 and protrusion 308 of housing 301. In this way, a fluid to be measured is exposed to an underside of die 310 via apertures 303, 305, 322 and isolated from cavity 311, as well as the sensitive electrical components making up pressuring sensor package 330. This seal is achieved using mechanical force, without the use of adhesives, thus eliminating the drawbacks associated therewith, as described above. Moreover, as no adhesive is used, pressure sensor package 330 is more easily installable and removable from pressure sensor assembly 300, facilitating assembly, repair, replacement, and/or inspection thereof.

Figure 10A:
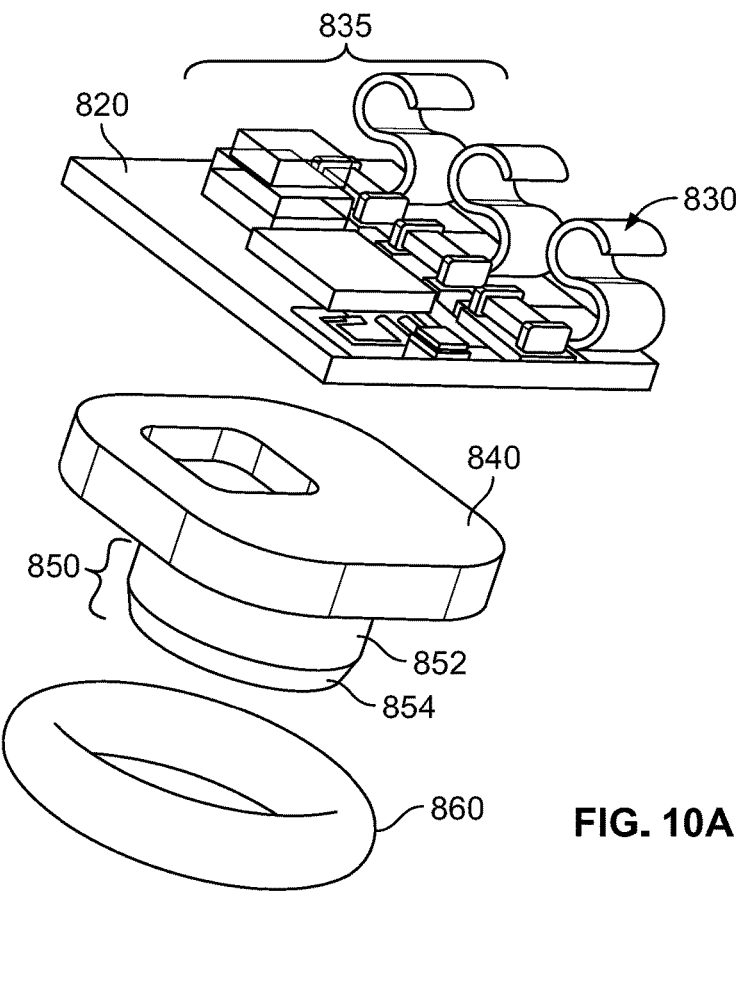
FIG. 10A is an exploded view of a pressure sensor package according to another embodiment of the present disclosure.
Figure 10B:
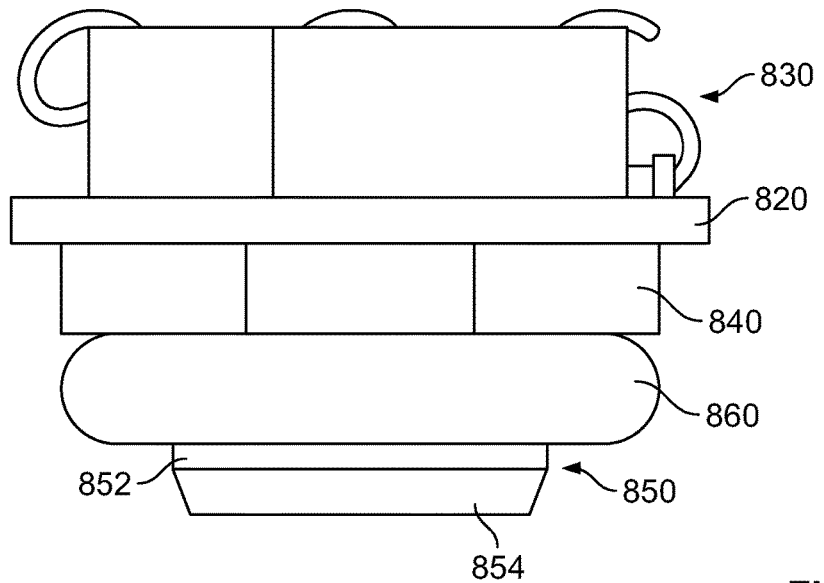
FIG. 10B is an assembled view of the pressure sensor package of FIG. 10A.

FIGS. 10A and 10B illustrate an alternative arrangement for sealing a pressure sensing package 830 to a sensor housing (e.g., housing 301 of FIG. 3A) according to embodiments of the present disclosure. As illustrated, pressure sensor package 830 may comprise features similar to those described throughout this disclosure, including pressure sensing components and corresponding electrical connections 835 arranged on a substrate 820. According to embodiments, substrate 820 of pressure sensor package 830 may be mounted to a base or spreadsheet 840. Base 840 may define, or may have attached thereto, a tube or annular protrusion 850 extending therefrom. Protrusion 850 may define a generally flat or generally vertically-oriented radial sealing surface 852, as well as a tapered end portion 854 for aiding installation operations. A sealing element 860, such as an elastic o-ring seal, is configured (i.e. sized) to be inserted over annular protrusion 850 and into sealing engagement with sealing surface 852. An assembled package 870, as shown in FIG. 10B, may be installed into an open end of a sensor housing, as described above with respect to FIG. 3A. Specifically, a complementary sensor housing may be provided having a cylindrical recess formed therein for receiving annular protrusion 850 and sealing element 860 of assembled package 870. The recess would be sized so as to create a sealing engagement between sealing element 860 and an inner annular wall thereof.

Referring again to FIG. 3A, Force F for creating any of the above-described seals may be generated and applied to pressure sensor package 330 (or 830) by any number of mechanisms. In one embodiment, a electrical connector or plug assembly (FIGS. 4A-4C), is configured to bear on die housing 350, applying a force thereon in the indicated direction. In other embodiments, a separate clamping mechanism may be used for applying force F in the indicated direction. In one particularly advantageous embodiment, spring elements 352, in addition to providing electrical connections to and from pressure sensor package 330, may also provide the force required to maintain a seal between glass substrate 320 and elastomeric sealing element 307 and/or protrusion 308. In this embodiment, the illustrated free ends of spring elements 352 may bear against and thus be compressed by, for example, an exposed underside or electrical contacts of a connector, cap or plug assembly installed over and generally covering cavity 331 for generating the described force F.

Figure 4A:
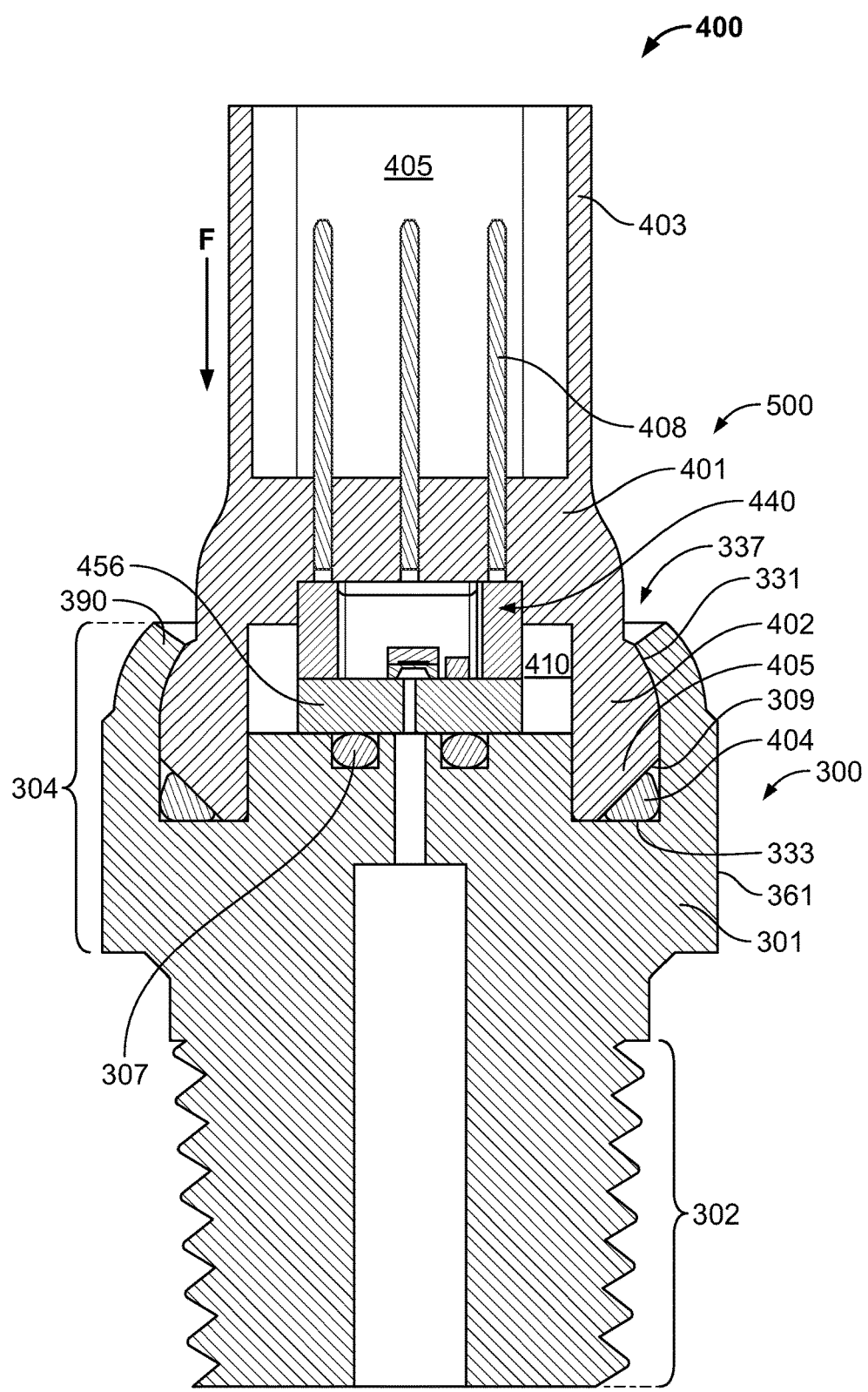
FIG. 4A is a cross-sectional view of a fully-assembled pressure sensor according to an embodiment of the present disclosure including the pressure sensor assembly of FIG. 3A and a corresponding sensor electrical connector installed therein.
Figure 4C:
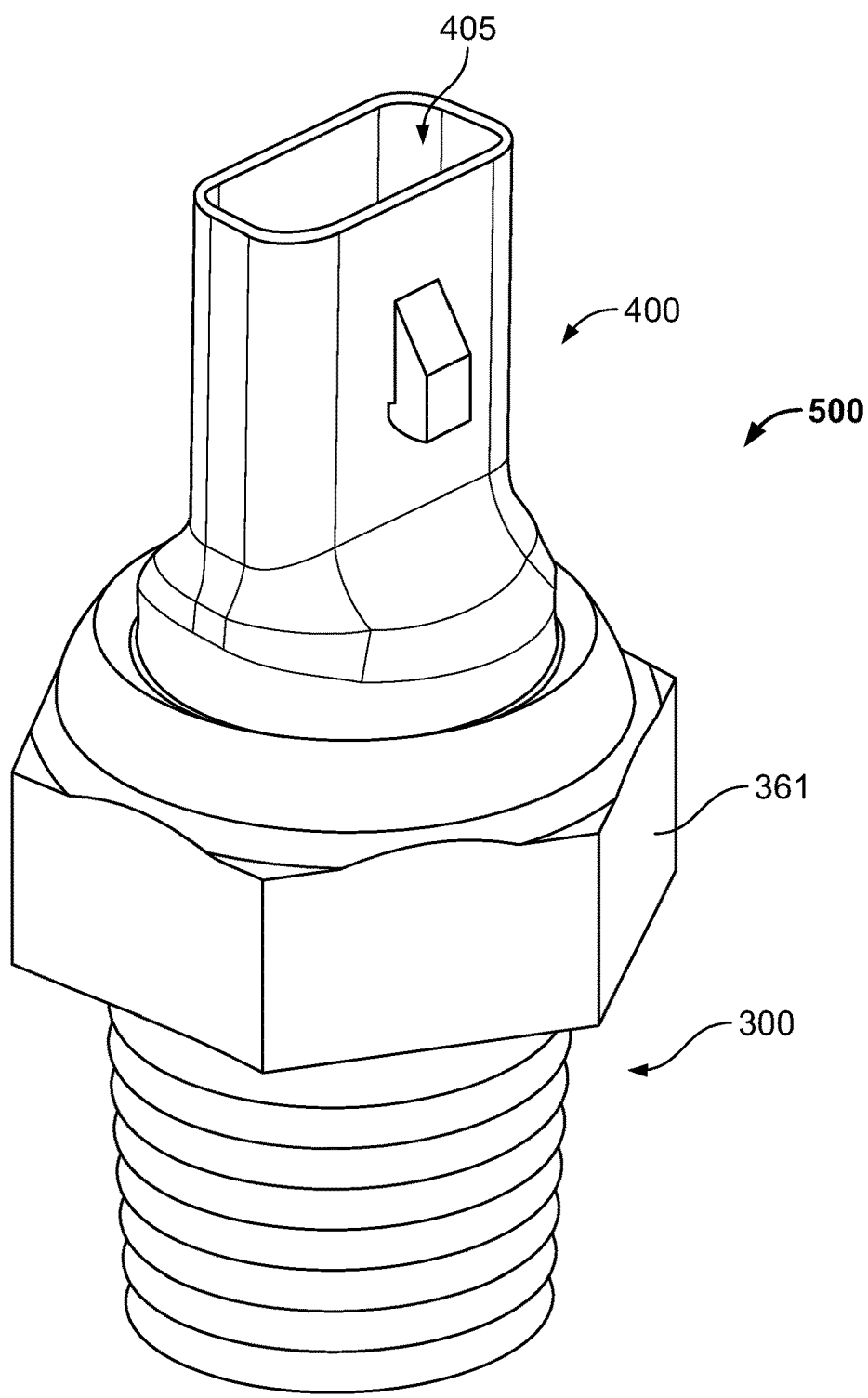
FIG. 4C is a perspective view of the fully-assembled pressure sensor of FIG. 4A.

More specifically, referring to FIGS. 4A, 4B and 4C, an exemplary fully-assembled pressure sensor 500 includes pressure sensor assembly 300, similar to that described above with respect to FIG. 3A, housing a gel-filled pressure sensor package 440, similar to pressure sensor package 330 of FIGS. 3A and 3B. Pressure sensor 500 further includes an electrical connector or plug 400 attached to pressure sensor assembly 300 for establishing electrical connections between pressure sensor package 440 and an external system. Connector 400 includes a body 401, such as a monolithic polymer body. Body 401 defines a first aperture 405 formed in a first end 403 thereof, and a second aperture 410 formed in a second end 402 thereof, opposite first end 403. As illustrated, second end 402 is configured to be inserted into open end 337 of cavity 331 of housing 301. Connector 400 may be secured to pressure sensor assembly 300 via a crimp or crimp-like connection. Specifically, a portion 390 of body 301 defines an arcing or curved profile extending radially inward (i.e. a crimped profile) into an area of open end 337 of cavity 331. Portion 390 of body 301 is sized and shaped to capture a complementary arcing curved exterior wall of second end 402 of connector 400. In one embodiment, portion 390 is plastically deformed or "crimped" into the illustrated radially inward extending profile after second end 402 of connector 400 has been inserted into cavity 331 during a manufacturing process. In other embodiments, the arcing or crimped profile of portion 390 is pre-formed in body 301, and first end 402 of connector 400 inserted into cavity 331 via the application of a force significant enough to elastically deform second end 402 as it is inserted.

Once installed, a seal between connector 400 and pressure sensor assembly 300 may be realized via a sealing element 404, such as an elastic o-ring type seal, arranged in annular recess 309. In particular, an adhesive free or mechanical seal is achieved between a tapered end 405 of body 401 and cavity floor 333 of housing 301 in response to force F acting in the indicated direction. The crimped connection, and more specifically, the contour and dimensions of portion 390 may be operative to generate force F. The same force F also acts on a top surface of pressure sensor package 440, creating a seal between a substrate 456 thereof and body 301 via sealing element 307, as described above with respect to FIG. 3A.

In the illustrated installed state, electrical connections are established between a plurality of electrical conductors (e.g., three), in this case male pins or contacts 408 embedded in connector 400, and the electrical components of sensor package 440 via electrically conductive spring elements 452, as shown in FIG. 4B. Accordingly, electrical connections between sensor package 440 and external equipment are achieved by inserting a corresponding male electrical connector or plug into recess 405 of connector 400 for electrically contacting exposed ends of contacts 408.

Figure 5A:
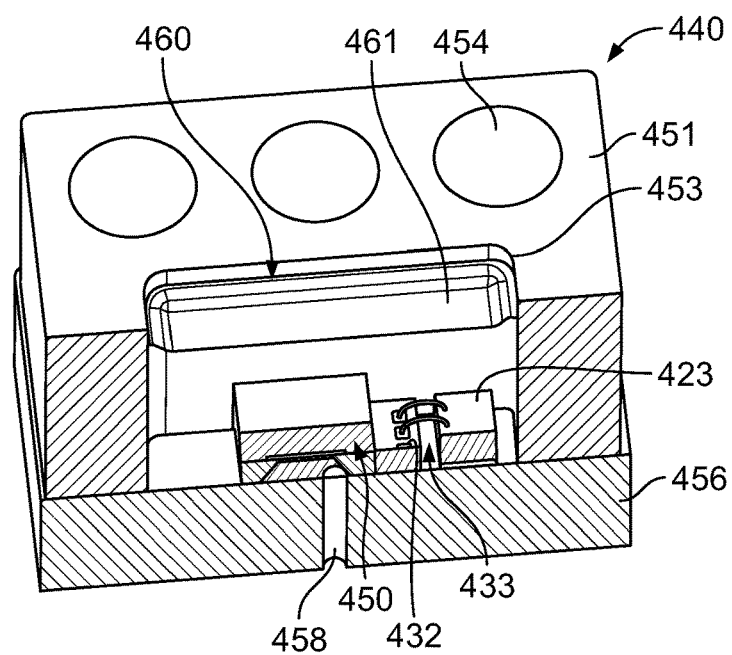
FIG. 5A is a cross-sectional view of a pressure sensor package according to another embodiment of the present disclosure.
Figure 5B:
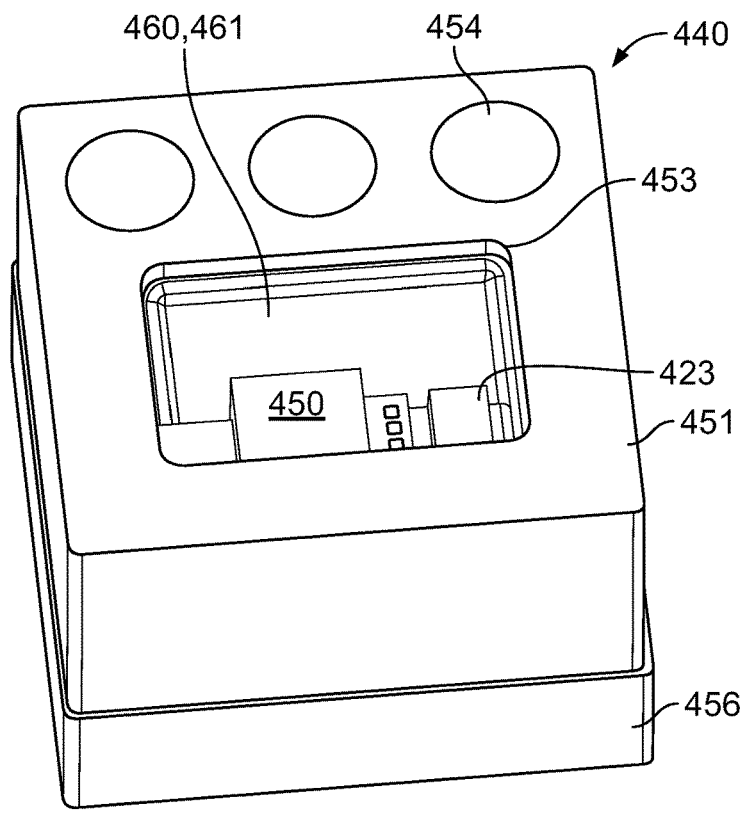
FIG. 5B is a perspective view of the pressure sensor package of FIG. 5A.

FIGS. 5A and 5B illustrate pressure sensor package 440 shown in FIGS. 4A and 4B in more detail. Pressure sensor package 440 comprises features similar to that of pressure sensor package 330 of FIGS. 3A and 3B and includes a pressure sensing die 450, such as a semiconductor (e.g. silicon) die. As set forth above, die 450 may comprise piezo-resistive or piezo-sensitive elements, by way of example only, arranged or formed thereon for detecting diaphragm strain in response to a force or pressure. Pressure sensor package 440 further comprises a substrate 456, such as a glass substrate, defining an aperture or pressure port 458 formed therethrough (e.g. by a drilling operation). Substrate 456 may comprise borosilicate glass, or other materials bondable (e.g., anodically bondable) to silicon. Die 450 may be arranged directly on substrate 456 and in communication with aperture 458. In this way, a sensing diaphragm of die 450 may be exposed to a fluid or medium via aperture 458 for detecting a pressure applied thereto. In other embodiments, die 450 may be secured to a substrate of any suitable material via other techniques, such as soldering, glass frit and eutectic operations.

By way of further example, one or more conductive bond or connection pads 432 may be formed on a surface of die 450. Bond wires 433 may also be provided for forming electrical connections between die 450 and, for example, an ASIC 423 arranged on substrate 456 for providing additional functionality to the package. This signal conditioning circuitry may provide for, for example, amplification, analog-to-digital conversion, offset compensation circuitry, and/or other suitable signal conditioning electronics. Electrical connection to an overall system can be made by surface mounted wires from electrical traces or vias present on the substrate. According to embodiments of the present disclosure, die 450 may be anodically bonded or electrostatically sealed to glass substrate 456 at a junction extending around a perimeter of die 450. This process results in the formation of a strong, hermetic seal, isolating a fluid or medium to be measured from an external environment. It should be understood that this adhesive-free bond is unaffected by any corrosive properties of a fluid or medium and without the limitations of adhesives.

Figure 8:
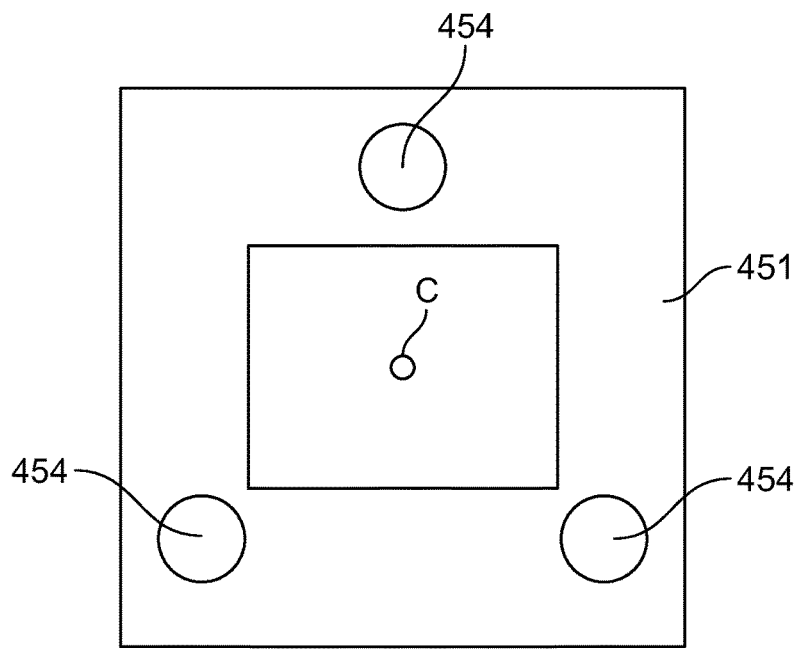
FIG. 8 is a simplified top view of a die housing or lid according to an embodiment of the present disclosure.
Figure 9:
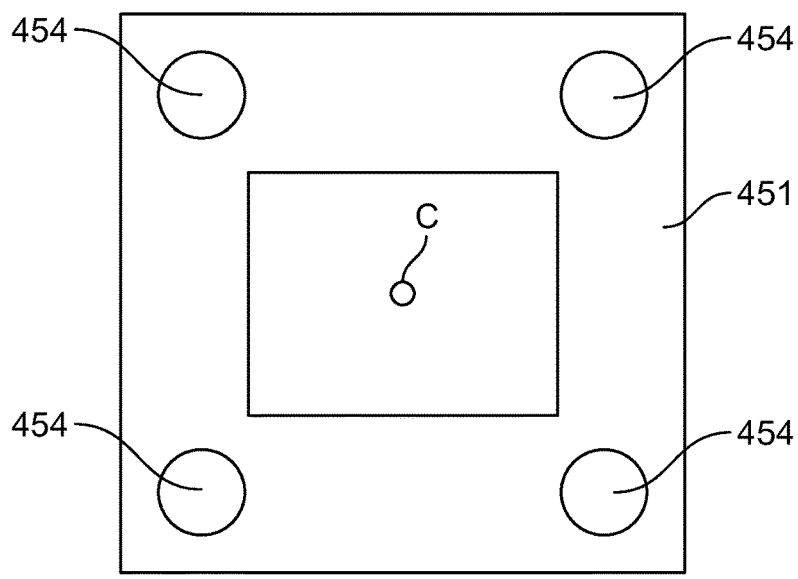
FIG. 9 is a simplified top view of a die housing or lid according to an embodiment of the present disclosure.

Pressure sensor package 440 further comprises a die housing 451. Die housing 451 comprises a circumferential wall 453 defining a cavity space or aperture 460. Die housing 451 may be arranged on and attached to glass substrate 456. Die housing 451 is configured (i.e., sized and located) such that it generally surrounds, or at least partially surrounds, pressure sensing die 450, as well as ASIC 423, for example. Die housing 451 further defines apertures 454 formed therethrough. Electrical conductors, embodied herein as elastic spring elements 452 (see FIG. 4B), may be arranged within apertures 454 in an assembled state. Elastic spring elements may be embodied as, for example, coil springs, leaf springs, flat springs or "S" shaped springs (see FIGS. 10A and 10B). Die housing 451 and apertures 454 are configured (i.e., sized and located), such that the locations of apertures 454 correspond generally to, for example, electrical bond or connection pads formed on a top surface of glass substrate 456. As set forth above, spring elements 452 may be used to enable electrical connections between pressure sensor package 440 and an external portion of the system, as well as to generate a force on substrate 456 for creating a seal with a sensor housing (e.g. housing 301, FIG. 4A). Referring generally to FIGS. 8 and 9, alternative locations for apertures 454 formed in die housing 451 are shown. Apertures 454 may be arranged in a radially-symmetric manner with respect to a center C (FIGS. 8 and 9) as well as symmetrically with respect to die housing 451 (FIG. 9) for equalizing the distribution of any force created by the spring elements inserted therein, and thus improving the uniformity of the seal between a substrate and a sensor housing. Center C may correspond to, for example, the radial center of sealing element 307 (FIG. 4A) or a center of substrate 456, by way of example only. In embodiments, pressure sensor package 440, and specifically aperture 460 may be coated or filled with with, for example, a gel 461 for increasing humidity and water protection prior to being incorporated into an assembled pressure sensor. It should be understood that pressure sensor package 440 may be manufactured, and thus tested, independently of (and in advance of its incorporation into) an assembled pressure sensor.

Figure 6:
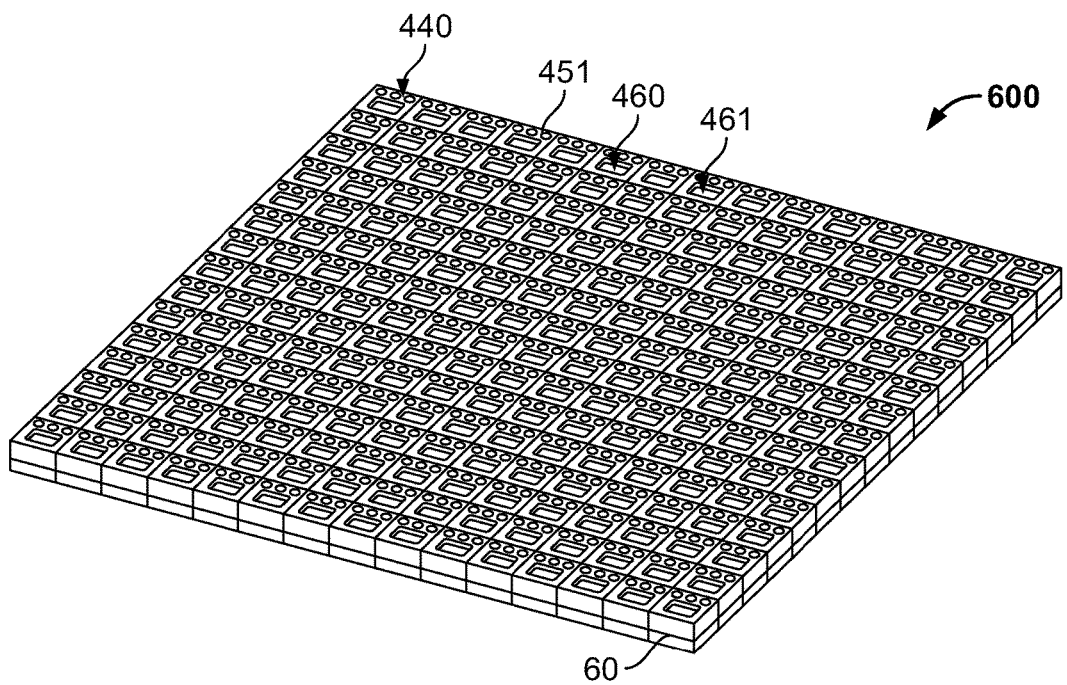
FIG. 6 is a perspective view of an array of pressure sensor packages according to the embodiments of FIGS. 5A and 5B useful for illustrating an exemplary manufacturing process.

Methods of manufacturing pressure sensor packages 440 according to embodiments of the present disclosure include the use of bulk manufacturing techniques and are generally shown with respect to FIG. 6. In one embodiment, a plurality or array 600 of pressure sensor packages 440 may be formed on a single glass substrate 60. Glass substrate 60 may be pre-drilled to form apertures or ports 458 (FIG. 5A) therethrough. Respective pressure sensing devices (e.g. dies 450) may be arranged or placed over each aperture, exposing a sensing surface of each die to a respective aperture. Once in place, an anodic bonding operation may be performed to secure the dies to substrate 60. Once bonded, electrical components may be added and electrical connections established as set forth above with respect to FIGS. 3B, 4B and 4B. A plurality of pre-formed die housings 451 may be arranged generally over respective dies and electrical components, and attached to substrate 60 via any suitable means. Gel 461 may be used to fill apertures 460, sealing the sensitive components of packages 440 therein. Individual resulting pressure sensor packages 440 may be separated from adjacent packages by, for example, etching or other cutting processes. This singulation may occur before or after completion of other assembly operations, such as the attachment of an ASIC and/or wire bonding, encapsulation and/or testing and calibration.

Figure 7:
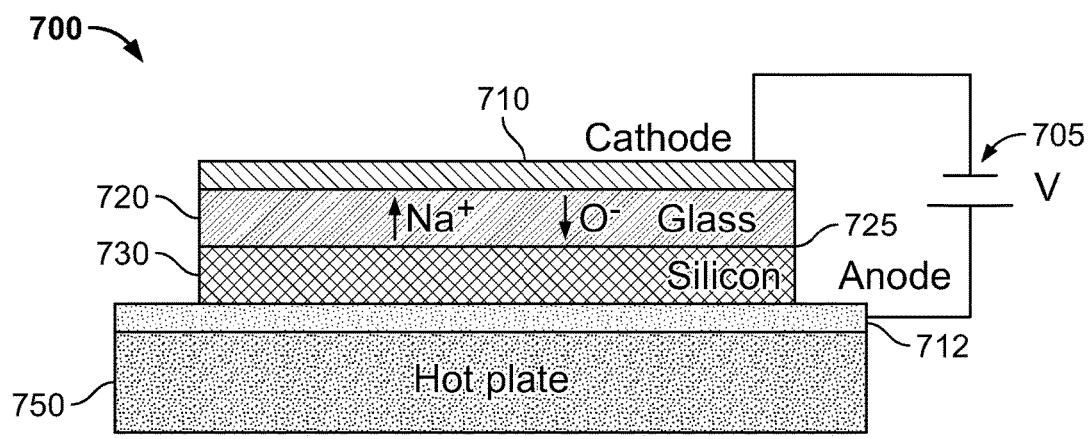
FIG. 7 is a simplified view of a system for performing an anodic bonding process useful for manufacturing pressure sensor packages according to embodiments of the present disclosure.

FIG. 7 illustrates a simplified system for performing an anodic bonding process which may be used to produce the above-described pressure sensing or sensor packages according to embodiments of the present disclosure. As shown, a system 700 for forming an anodic bond between a glass substrate 720 to a silicon element 730 (e.g. a MEMS sensing die) includes a voltage source 705 configured to produce, for example, a voltage on the order of, for example, 300-2000 volts (V). Voltage source 705 includes a first (cathode) electrode 710 and a second (anode) electrode 712. First electrode 710 is arranged on, or otherwise placed in contact with, a side of glass substrate 720 opposite silicon element 730. Second electrode 712 is arranged on, or otherwise placed in contact with, a side of silicon element 730 opposite glass substrate 720. The application of voltage across glass substrate 720 and silicon element 720 initiates the anodic bonding process, wherein sodium ions ($Na^+$) diffuse out of bond interface 725 toward a back side of first electrode 710. Oxygen ions ($O^-$) ions drift toward a bonding interface between glass substrate 720 and silicon element 730, reacting therewith to form silicon dioxide, thereby creating a strong bond without the use of conventional adhesives. In some embodiments, it may be preferred to perform the bonding process at elevated temperatures, for example, in the range of 250-450° C. in order to enhance ion mobility into glass substrate 720. System 700 may further include a heating element 750 configured to elevate the temperature of the package to be bonded to a desired level. In some embodiments, heating element 750 may also act as the second or anode electrode 712.

While embodiments of the present disclosure have been described as utilizing, for example, piezo-resistive elements to detect strain of a pressure-sensing diaphragm, it should be understood that any suitable type of sensing technology may be implemented without departing from the scope of the present disclosure. For example, sensors disclosed herein may implement capacitive, electromagnetic, piezoelectric, optical or thermal sensing techniques, as will be understood by one of ordinary skill in the art. Moreover, while the embodiments have generally been described in the context of pressure sensors, it should be understood that other sensor types may be manufactured according to embodiments of the present disclosure. For example, MEMS or other silicon-based devices, such as those used for measuring other forces, flow rates, densities, velocities, positions, displacement and the like may be manufactured using the glass substrate mounting and anodic bonding techniques described herein without departing from the scope of the present disclosure.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A sensor assembly, comprising:
   a housing defining a cavity;
   a pressure sensor package arranged within the cavity and comprising:
      a substrate having an aperture defined therethrough;
      a semiconductor die including a sensing diaphragm, the semiconductor die on a first side of the substrate such that the diaphragm is exposed via the aperture;
      a die housing arranged on the substrate and surrounding the semiconductor die, the die housing defining an aperture formed therethrough; and
      at least one electrically conductive element arranged within the aperture and in electrical communication with the semiconductor die; and
   a sealing element between the housing and a second side of the substrate configured to generate an adhesive-free seal between the housing and the second side of the substrate in response to a force placed on the substrate.

2. The sensor assembly of claim 1, wherein the housing comprises an aperture defined therethrough, the aperture of the housing being in communication with the aperture of the substrate when the pressure sensor package is arranged within the cavity of the housing.

3. The sensor assembly of claim 2, wherein the sealing element is arranged circumferentially with respect to at least one of the aperture of the housing and the aperture of the substrate such that the apertures are isolated from the cavity via the sealing element.

4. The sensor assembly of claim 1, further comprising an application specific integrated circuit (ASIC) arranged on the substrate.

5. The sensor assembly of claim 1, wherein the substrate comprises a glass substrate, and wherein the semiconductor die is anodically bonded to the glass substrate.

6. The sensor assembly of claim 1, wherein the at least one electrically conductive element comprises an elastic spring element arranged through the aperture of the die housing.

7. The sensor assembly of claim 6, wherein the die housing comprises a plurality of apertures formed therethrough, and wherein the pressure sensor package further comprises an elastic spring element arranged through each of the plurality of apertures of the die housing.

8. The sensor assembly of claim 7, wherein the elastic spring elements are configured to establish electrical connections between conductive features of the pressure sensor package and an external electrical system.

9. The sensor assembly of claim 8, wherein the at least one of the conductive features comprises a conductive pad formed on a surface of the substrate.

10. The sensor assembly of claim 8, wherein the sealing element is configured to generate the adhesive-free seal between the housing and the second side of the substrate in response to the force placed on the substrate generated by the elastic spring elements.

11. The sensor assembly of claim 8, further comprising a connector arranged within the cavity, the connector housing a plurality of electrical conductors in conductive contact with the elastic spring elements.

12. The sensor assembly of claim 11, further comprising a second sealing element for establishing an adhesive-free seal between the connector and the housing.

13. A method of manufacturing a sensor comprising the steps of:
   attaching a silicon sensing device to a substrate to form a pressure sensor package;
   inserting the pressure sensor package into a cavity of a pressure sensor housing;
   arranging the pressure sensor package on a surface of the pressure sensor housing within the cavity;
   inserting a connector at least partially within the cavity for establishing electrical communication between the pressure sensor package and an external system; and
   plastically deforming the pressure sensor housing for securing the connector at least partially within the cavity and for generating and applying a force on the pressure sensor package to create an adhesive-free seal between the pressure sensor package and the pressure sensor housing.

14. The method of claim 13, wherein the step of arranging the pressure sensor package on a surface of the pressure sensor housing within the cavity further includes the step of aligning an aperture formed through the substrate of the pressure sensor package with an aperture formed in the housing.

15. The method of claim 13, wherein the force for creating the seal between the pressure sensor package and the pressure sensor housing is generated via an elastic spring element, wherein the elastic spring element establishes the electrical communication between the connector and the pressure sensor package.

16. The method of claim 15, further comprising the step of forming a conductive pad on the substrate, wherein the electrical connection with the pressure sensor package is established via electrical contact between the elastic spring element and the conductive pad.

17. A sensor assembly, comprising:
   a housing defining a cavity;
   a pressure sensor package arranged within the cavity and comprising:
      a substrate having an aperture defined therethrough; and a semiconductor die including a sensing diaphragm attached to a first side of the substrate such that the diaphragm is exposed via the aperture;

a sealing element between the housing and a second side of the substrate configured to generate an adhesive-free seal between the housing and the second side of the substrate in response to a force placed on the substrate; and a connector arranged at least partially within the cavity and secured therewith via a crimped connection, the connector housing a plurality of electrical conductors for establishing an electrical connection with the pressure sensor package.

18. The sensor assembly of claim 17, wherein the crimped connection is defined by a portion of a sidewall of the housing extending radially-inward with respect to a center of the cavity.

19. The sensor assembly of claim 17, further comprising:

a die housing arranged on the first side of the substrate and surrounding the pressure sensor package; and a plurality of elastic spring elements arranged through apertures formed in the die housing, wherein the elastic spring elements are configured to establish electrical connections between conductive features of the pressure sensor package and an external electrical system via the plurality of electrical conductors of the connector.

* * * * *